United States Patent [19]
Liou

[11] Patent Number: 6,052,352
[45] Date of Patent: Apr. 18, 2000

[54] REMOVABLE RETAIN APPARATUS FOR A DISC

[75] Inventor: Dong-Yih Liou, Taoyuan, Taiwan

[73] Assignee: Acer Peripherals, Inc., Taiwan

[21] Appl. No.: 09/061,540

[22] Filed: Apr. 16, 1998

[30] Foreign Application Priority Data

Mar. 20, 1998 [TW] Taiwan .................................. 87204097

[51] Int. Cl.⁷ ............................ G11B 33/02; G11B 17/03
[52] U.S. Cl. .......................................... 369/77.1; 369/75.1
[58] Field of Search .................................. 369/77.1, 292, 369/75.1; 188/340

[56] References Cited

U.S. PATENT DOCUMENTS

| | | | |
|---|---|---|---|
| 2,999,566 | 9/1961 | Naudzius | 188/340 |
| 4,623,050 | 11/1986 | Copp | 188/340 |
| 5,070,968 | 12/1991 | Evans | 188/79.64 |
| 5,793,729 | 8/1998 | Soga et al. | 369/77.1 |

*Primary Examiner*—David L. Ometz
*Assistant Examiner*—Angel Castro
*Attorney, Agent, or Firm*—Fulbright & Jaworski L.L.P.

[57] ABSTRACT

The invention provides a removable retain apparatus for a disc within a disc player. When the disc player of the type is disposed horizontally and the retainer is not needed any more, the user may easily disassembly the removable retainer. The disc player has a tray within which a cavity is provided to accommodate the disc and the cavity defines a circumference along which a plurality of grooves on the tray and each corresponding removable retain apparatus is provided. The removable retain apparatus includes a disc holder, a pivot pin and a elastic device. The pivot pin has a cap portion and a root portion. The disc holder has a predetermined thickness and has a shaft inserted within one corresponding groove located along the circumference defined by the cavity. The shaft has a first slot running through the thickness of the disc holder and a second slot disposed at a predetermined angle with respect to the first slot. The elastic device is disposed within the groove and has a channel allowing passage of the root portion of the pivot pin. After assembly, the pivot pin is inserted through and into the channel of the elastic device and the first slot of the shaft with the cap portion of the pivot pin pressing the elastic means. The root portion engages within the second slot.

3 Claims, 4 Drawing Sheets

FIG. 3 (A)
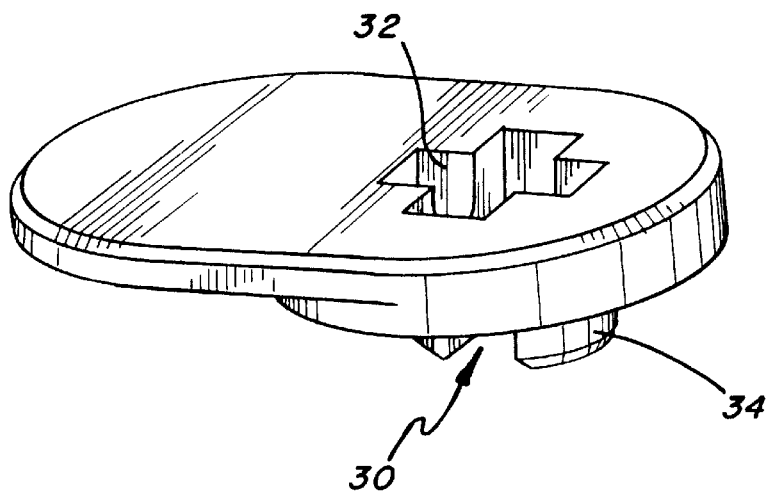
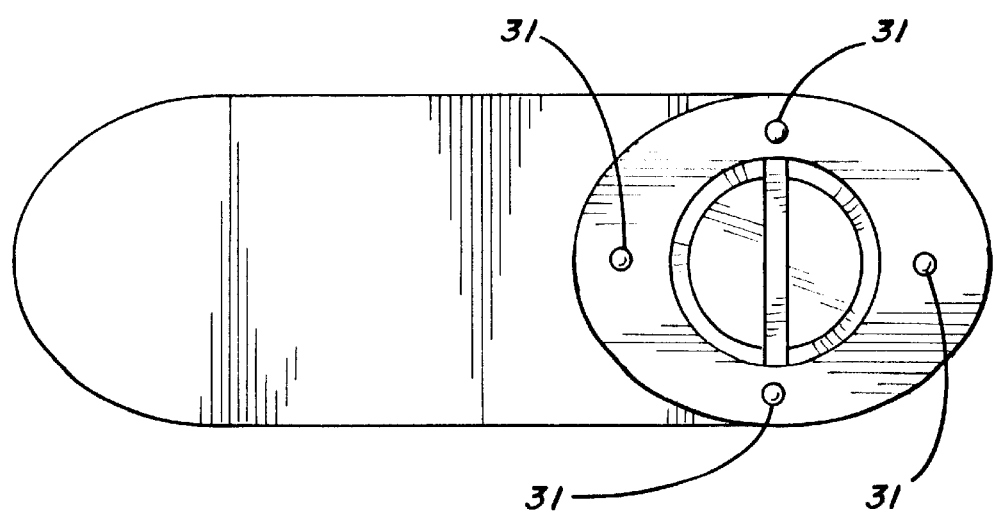
FIG. 3 (B)

REMOVABLE RETAIN APPARATUS FOR A DISC

FIELD OF INVENTION

The invention relates to an apparatus for retaining the disc vertically disposed within a disc player.

BACKGROUND OF INVENTION

In accordance with the disposition of disc within a CD ROM player, the CD-ROM player may be classified as drawer type, tray type or caddy type. As well known in the arts, for the drawer type CD-ROM player, the disc is directly mounted onto the turntable of a loader. In response to the instruction of user, the loader and the disc therein move inward or outward with respect to the CD-ROM player. Therefore, in either condition of CD-ROM player of drawer type being vertically or horizontally disposed, there is not any problem regarding the disposition of disc therein.

Like the 3.5 inch floppy disc drive, a disc is mounted within a caddy which is then inserted into the caddy type CD-ROM player. Therefore, in either condition of CD-ROM player of caddy type being vertically or horizontally disposed, there is not any problem regarding the disposition of disc therein.

However, for the tray type CD-ROM player, the disc is accessible to the user and is placed within the cavity of tray which moves outwardly or inwardly as instructed. After the disc is placed within the tray, the CD-ROM player moves the tray inward under user's control. After the inward movement is complete, the disc then is loaded onto the turntable. As the tray type CD-ROM player is horizontally disposed, the disc within the cavity of tray moves inward or outward without any difficulty. However, as the CD-ROM player is vertically disposed, due to the gravity effect, the disc will possibly take a position within the cavity of tray other than the correct position required for loading of disc onto the turntable. Therefore, when the working environment of a user requires a vertical disposition of the personal computer, in which a conventional tray type CD-ROM is included, the user encounters difficulty to accurately load the disc into the turntable of the CD-ROM player.

To overcome the problem associated with the vertically disposed tray type CD-ROM player mentioned above, prior arts technology, in general, utilizes a rotatable retainer 11 as shown in FIG. 1(*a*) or, alternatively, a pullable retainer 13 as shown in FIG. 1(*b*), to retain the vertically disposed disc (not shown).

As retainer 11 is implemented and the user does not need the retainer 11 when the disc player of this type is placed horizontally, the retainer 11 will be an obstacle while disc is being placed. In a more worse situation, the retainer 11 might scratch the surface of the disc.

Therefore, it is the main object of the invention to provide a retainer which is easily removable when not used.

SUMMARY OF INVENTION

The invention provides a removable retain apparatus for a disc within a disc player. The disc player has a tray within which a cavity is provided to accommodate the disc and the cavity defines a circumference along which a plurality of grooves on the tray and each corresponding removable retain apparatus is provided.

The removable retain apparatus includes a disc holder, a pivot pin and a elastic device. The pivot pin has a cap portion and a root portion.

The disc holder has a predetermined thickness and has a shaft inserted within one corresponding groove located along the circumference defined by the cavity. The shaft has a slot running through the thickness of the disc holder and a position slot disposed at a predetermined angle with respect to the slot.

The elastic device is disposed within the groove and has a channel allowing passage of the root portion of the pivot pin.

After assembly, the pivot pin is inserted through and into the channel of the elastic device and the slot of the shaft with the cap portion of the pivot pin pressing the elastic means. The root portion engages with the position slot.

BRIEF DESCRIPTIONS OF THE DRAWINGS

FIG. 1(A) discloses a prior art retainer.

FIG. 1(B) discloses another prior art retainer.

FIG. 2 discloses a perspective view of the invention.

FIG. 3(A) discloses in details the structure of the disc holder in FIG. 2.

FIG. 3(B) shows the back view of the disc holder 221.

DETAILED DESCRIPTION OF THE PREFERRED EMBODIMENT

Figure 1A:
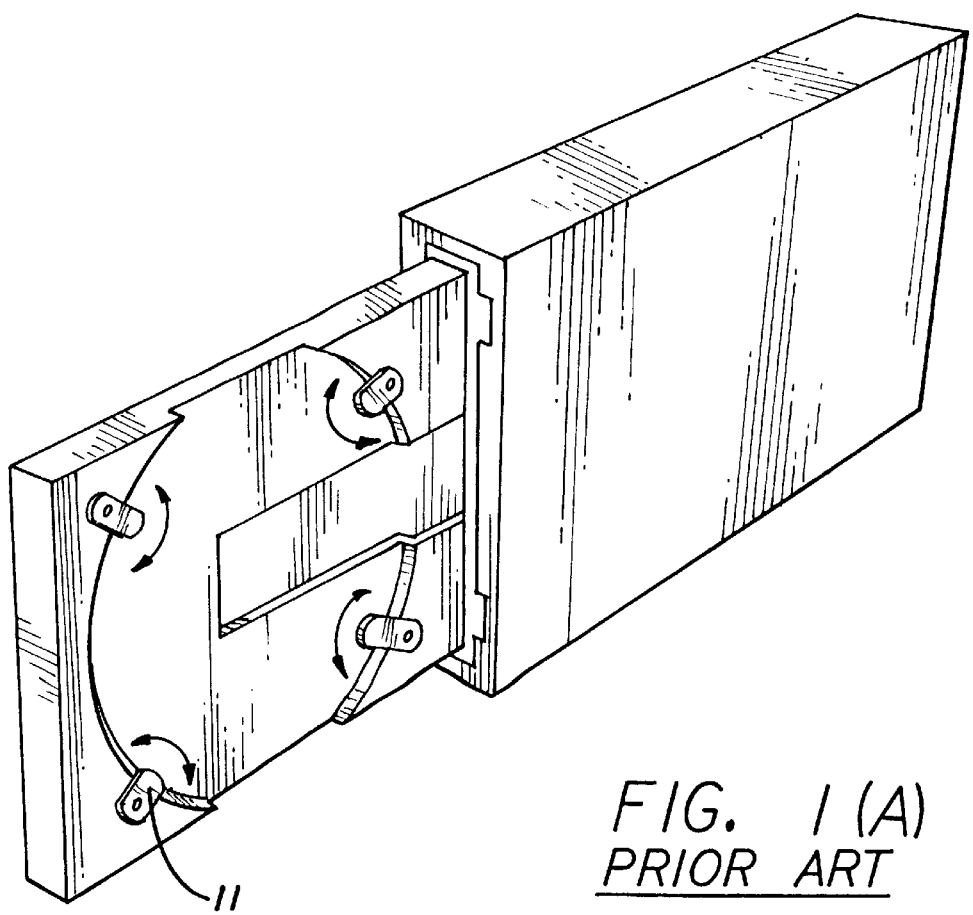
Figure 1B:
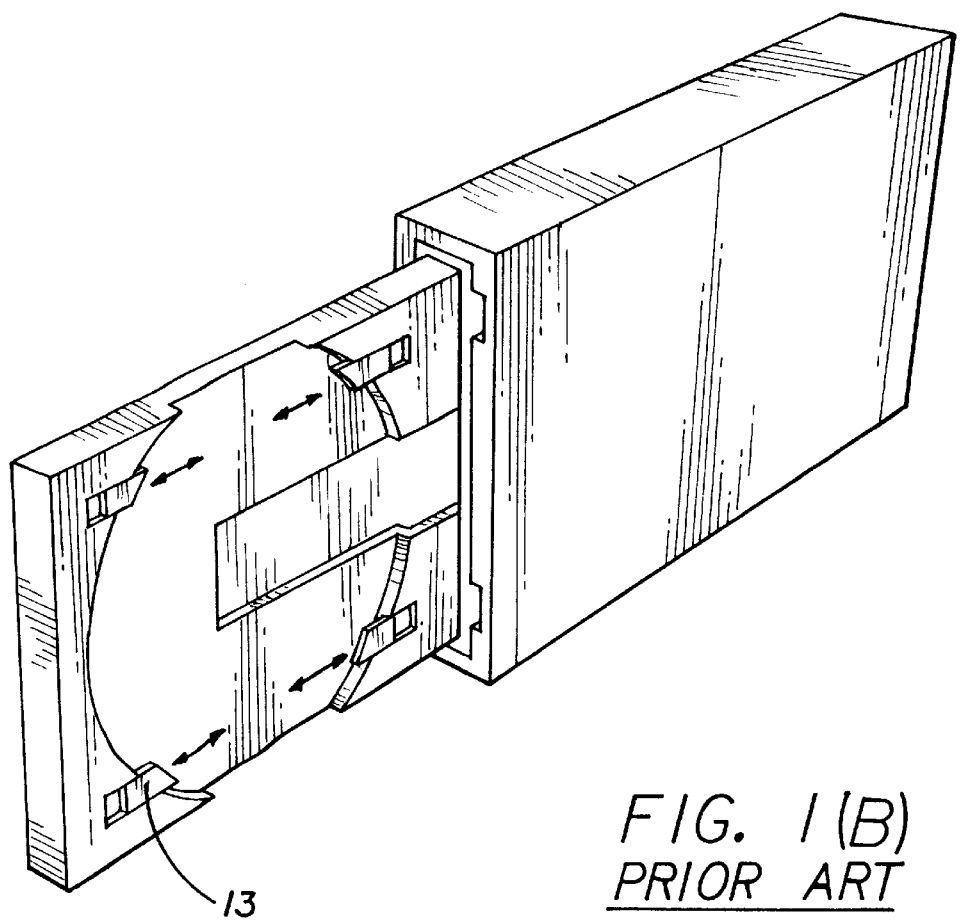
Figure 2:
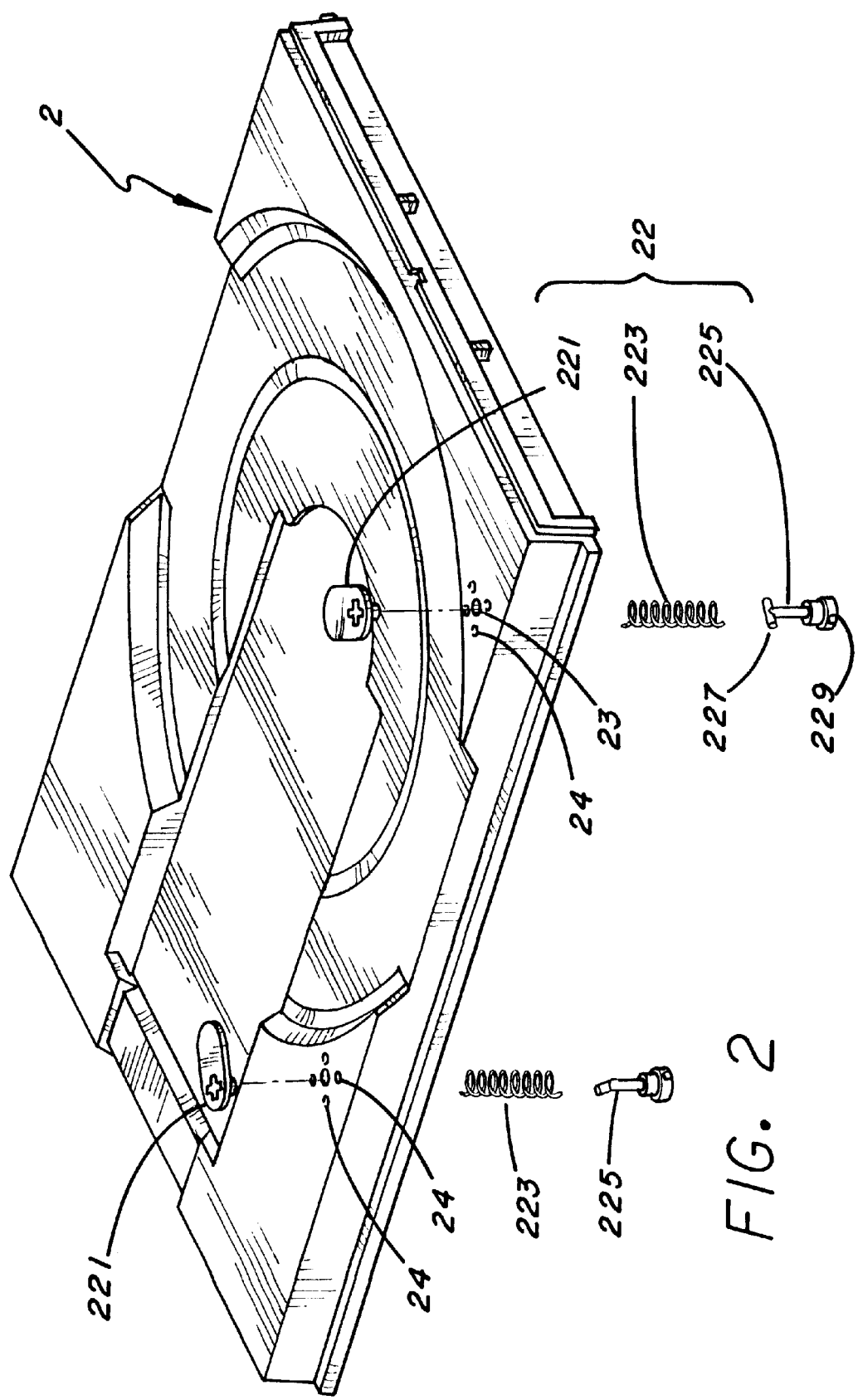

Referring to FIG. 2 and FIG. 3, the disc player of the invention includes a tray 2 within which a cavity is provided to accommodate the disc. The cavity defines a circumference along which a plurality of grooves 23 on the tray 2 and corresponding retain apparatuses 22 in accordance with the invention are provided.

The removable retain apparatus 22 of the invention may be implemented respectively on the right hand side and left hand side as shown in FIG. 2. However, implementation of four retainers 22 (not shown) is also feasible with two of them being located mirror to the other two retainers. Under four retainers configuration with symmetry arrangement, the disc player can be disposed vertically with the cavity either facing the right or facing the left. The retain apparatus 22 includes a disc holder 221, a pivot pin 225 and an elastic device 223, e.g. a spiral spring. After assembly, the disc holder 221, a pivot pin 225 and an elastic device 223 are connected together as recited in the followings.

The disc holder 221 has a predetermined thickness, shown in FIG. 3(A) with one short shaft 34. After assembly, the short shaft 34 rotates within the corresponding groove 23 of the tray under manipulation of the user. The bottom surface of the disc holder 221 is provided with at least a position dot 31 shown in FIG. 3(B). The positioning dot 31 cooperates with its corresponding depressions 24 over the surface of tray 2 to define the orientation of the disc holder 221 with respect to the tray 2. In a preferred embodiment, four equally spaced depressions 24 are provided. Under such embodiment, each time the disc holder 221 is rotated by 90 degrees along its axis, it proceeds to a next position and stays there until the user makes another adjustment.

Referring to FIG. 3(A), and FIG. 3(B) the preferred shape of the disc holder 221 is in ellipse shape. Other shapes may be possible. The portion of the disc holder 221 connecting with the pivot pin 225 mainly includes a slot 30 running through the thickness of the disc holder 221 and a position slot 32 disposed at a predetermined angle with respect to the slot 30. The pivot pin 225 has a cap portion 229 and a root portion 227. The dimension of the root portion 227 is smaller than the channel provided in the elastic device 223. The dimension of the cap portion 229 is larger than outer dimension of the elastic device 223. The outline of the root portion 227 matches with the shape of position slot 32 such that the root portion 227 may be received within the position slot 32. The surface of the cap portion 229 has a slit for receiving a line-shaped screw driver during the assembly/ de-assembly process. The elastic device 223 is disposed, from below, within the groove of the tray 2 when assembled, and, has a channel allowing passage of the root portion 227 of the pivot pin 225.

During assembly process, the shaft 34 of the disc holder 221 is inserted into the corresponding groove 23 located along the circumference defined by the cavity. The pivot pin 225 is inserted through and into the channel of the elastic device 223, and, then, the slot 30 of the disc holder 221 from below. The elastic force of the elastic device 223 is to be overcome by pressing the cap portion 229 toward the bottom of the elastic device 223. A line-shaped screw driver is used to press the pivot pin 225 toward the elastic device 223 and to rotate the pivot pin 225 such that the root portion 227 engages with the position slot 32. It is obvious the retainer 22 of the invention is removable and the disassembly procedure is a reverse step to the assembly procedure recited above.

Due to the elastic force provided by the elastic device 223 in compression state and the corresponding force applied by the root portion 227 over the disc holder 221, the disc holder 221 presses toward the surface of the tray 2 and a stable state is reached. By predetermined design of the compression force provided by the elastic device 223, the user may easily make orientation of the disc holder 221 by fingers.

I claim:

1. A removable retain apparatus for a disc within a disc player, said disc player having a tray within which a cavity is provided to accommodate the disc, the cavity defining a circumference along which a plurality of grooves are provided on the tray, a removable retain apparatus being provided within each of the plurality of grooves, the removable retain apparatus comprising:

a disc holder with a predetermined thickness, the disc holder having a shaft inserted within one corresponding groove located along the circumference defined by the cavity, the shaft having a first slot running through the thickness of the disc holder and a second slot disposed at a predetermined angle with respect to the first slot;

a pivot pin, the pivot pin having a cap portion and a root portion;

elastic means disposed within the groove, the elastic means having a channel allowing passage of the root portion of the pivot pin;

wherein the pivot pin is inserted through and into the channel of the elastic means and the first slot of the shaft, with the cap portion of the pivot pin, after assembly, pressing the elastic means, and the root portion engaging with the second slot.

2. The apparatus of claim 1, wherein the disc holder has a bottom surface provided with at least a positioning dot for cooperating with a corresponding depression on the tray to define the orientation of the disc holder with respect to the tray.

3. The apparatus of claim 1, wherein the elastic means is a spiral spring.

* * * * *